United States Patent
Jung

[11] Patent Number: 6,049,716
[45] Date of Patent: Apr. 11, 2000

[54] SOFT SWAP HANDOFF METHOD IN CDMA CELLULAR SYSTEM

[75] Inventor: Jin-soo Jung, Seoul, Rep. of Korea

[73] Assignee: Samsung Electronics Co., Ltd., Rep. of Korea

[21] Appl. No.: 08/965,082

[22] Filed: Nov. 6, 1997

[30] Foreign Application Priority Data

May 29, 1997 [KR] Rep. of Korea ............. 97-21780

[51] Int. Cl.[7] ................................ H04Q 7/20
[52] U.S. Cl. ................ 455/442; 455/437; 370/331; 370/332
[58] Field of Search .................. 455/436, 437, 455/438, 442, 525; 370/331, 332, 335, 342

[56] References Cited

U.S. PATENT DOCUMENTS

| | | | |
|---|---|---|---|
| 5,434,853 | 7/1995 | Hemmady et al. | 370/331 |
| 5,577,022 | 11/1996 | Padovani et al. | 370/332 |
| 5,722,074 | 2/1998 | Muszynski | 455/442 |
| 5,781,861 | 7/1998 | Kang et al. | 455/442 |
| 5,850,607 | 12/1998 | Muszynski | 455/442 |
| 5,854,785 | 12/1998 | Willey | 370/332 |
| 5,901,354 | 5/1999 | Menich et al. | 455/442 |
| 5,920,550 | 7/1999 | Willey | 370/332 |

*Primary Examiner*—Dwayne D. Bost
*Assistant Examiner*—Quochien B. Vuong
*Attorney, Agent, or Firm*—Dilworth & Barrese

[57] ABSTRACT

A method for providing a soft swap handoff in a CDMA communication system is provided. Pilot signal strengths of newly detected base stations that are above a predetermined level are compared with those of base stations presently in an active state. If the pilot signal strength of a newly detected base station is above the predetermined level and also stronger by a prescribed value than the weakest one among those of the base stations presently in the active state, then a base station controller (BSC) instructs the mobile station to drop the weakest base station among the base stations that are presently in the active state and to add the newly detected base station.

8 Claims, 6 Drawing Sheets

(a)

(b)

(c)

SOFT SWAP HANDOFF METHOD IN CDMA CELLULAR SYSTEM

FIELD OF THE INVENTION

The invention relates to the method of improving the efficiency of the soft handoff method which is the inherent handoff method of the Code Division Multiple Access system in the mobile communication systems using Code Division Multiple Access technology.

DESCRIPTION OF THE RELATED ART

The object of the mobile station is to remove obstacles during moving through a wide area. Mobile station should reregister the system regularly in the idle state when the line is not busy.

Communication system is related to mobile station by plenty of base station which are allocated each region and the region is managed by one base station is called a cell.

A cell is the minimum unit of region that can be served by one base station and composed of many sectors. This cell is expanded into the service region of Base Station Center which manages base station.

The base station center consists of base station transfer system(BTS) and BSC including mobile station center in some cases.

When station is working, the communication system which is composed of mobile station center, base station or mobile station center manages the communication between base station and TSC to maintain an efficient radio link.

In CDMA and wide-band CDMA technology, one system can transmit and receive mobile transmission from more than two base stations simultaneously. And one TSC can build up channel and transfer/receive signal with more than two base stations.

These functions, CDMA system can deal with the handoff from one base station to another, or one antenna region to another in one base station.

It is important to control the quality of signal and vocal information which was transferred from many BSC. In CDMA cellular or PCS system, various style of handoff is being supplied to keep the continuity of station. These handoff can have some difference efficiency in the aspects of credibility of station's continuity and load of system according to the method and content of embodiment.

When handoff is needed because of the moving of TSC, in CDMA system it is intended first of all to maintain the continuity of call by soft handoff which is the handoff by the same frequency, however, when inevitable, by hard handoff which is handoff between frequencies. Handoff makes a stable handoff process possible by finding neighboring cell that should be handoffed, adding a supplement mechanism called Dummy Pilot in each base station and TSC.

That is to say, TSC measures the strength of pilot which is created from each base station, and when the degree of strength becomes threshold, it keeps communicating by moving to other neighboring base station; Base Transceiver System.

TSC keeps chasing the pilot signal which is transferred from base station and grasps the existence of CDMA channel and measures the degree of strength of channel signal. When TSC detects a new pilot signal with enough strength regardless of forward traffic channel, TSC and base station handoff.

In CDMA system forward traffic channel which is transferred from base station to TSC means a channel for transferring data, vocal signal, power control beat or signal treatment channel data etc.

FIG. 1 illustrates the flow of handoff which is executed between mobile station and base station.

As shown in the picture, the mobile station during communication with BSC A confirms the strength of pilot signal continuously which is transferred from many neighboring base station.

When the degree of strength of neighboring base station B's pilot signal is over T_ADD; the critical measurement for connecting channel with the BSC, mobile station transmits the strength measurement message(PSMM) signal to base station. Here, ADD means that a channel is set up between base station and TSC through handoff.

Base station A receives PSMM signal through BSC, BSC completes preparation for Soft ADD by allocating communication channel on base station B which belongs to PSMM signal.

After receiving pilot strength measurement message through BSC, base station starts to transmit traffic signal and obtains opposite direction traffic channel.

To use base station A & B BSC transmits handoff direction message(HDM) to TSC.

When having grasped base station B by receiving HDM signal from BSC, TSC and base station B creates an activated state and then transmits handoff communication message (HCM) to BSC.

By doing this TSC builds up a channel with base station A or B, and starts using Active set A,B. Two base stations perceive that handoff has been completed by receiving HCM signal through BSC.

TSC checks traffic packet( including data or vocal information and power control beat. etc.) every 20 ms, chooses a traffic packet which has the least CRC(Cyclic Redundancy Checks) error.

Said CRC error detection means the method that checks whether there's an error on the message by dividing the transferred message into a specific beat pattern and checking the rest.

BSC transfers the same traffic packet to base station A and B simultaneously. That is, the mobile station is in the handoff ADD state with base station A or B, keeps communicating with two base stations simultaneously, and the two base stations which are being kept communicated each other are called Active set. These process is called soft handoff add process.

In case that the pilot strength of base station A is not more than T_DROP and this state continues during the T_DROP (timer) time while TSC is communicating with base station A or B, TSC transmits PSMM signal on base station k Here, drop means the channel being removed.

After receiving PSMM signal, TSC transfers HDM signal including base station B to TSC so that TSC drops base station A, use only B.

Received HDM signal, TSC informs that a channel with base station B is set up by transferring HCM signal after making base station A into the inactivated state. Received HCM signal, BSC removes base station A by canceling traffic channel which is allocated to base station A. This process is called soft handoff drop process.

Through said process, TSC moves from base station A to B, keeping a stable communication.

In soft handoff algorithm that functions as above mentioned, TSC measures the strength of all the pilot signal which is transferred from neighboring base station and informs BSC when the strength reaches the critical measurement T_ADD and T_DROP.

In CDMA system, BSC is programmed to be able to execute soft handoff up to 3 base station(cell) simultaneously. Therefore, in the electronic environment with more than 3 base stations that the strength of pilot signal is higher than T_ADD, the previously mentioned dropping or adding process can not be executed, so BSC doesn't carry out handoff.

FIG. 2 illustrates the transfer terminal center in the region where more than 3 cells are piled up. As illustrated in the figure, in the midtown area with crowded electronic wave, one mobile station can receive electronic wave from more than 3 base station FIG. 3 illustrates a handoff process in case mobile station in the region with more than 3 piled up cells according to the previous technology.

Because BSC is limited to execute soft handoff with up to 3 base stations, handoff is executed through the illustrated process.

FIG. 3(A) illustrates mobile station in the state of add with base station A and B or C. FIG. 3(B) illustrates the state that the strength of base station D is higher than A but base station A is still higher than the minimum critical measurement T_ADD as TSC moves to the service region of base station D.

Because TSC is already receiving signals from 3 base stations, it cannot execute handoff even though the pilot strength in candidate set is much higher than the pilot strength of previously activated region. In this case the signal of candidate set, base station D functions to other participants as an interference.

FIG. 3(C) illustrates the case wherein the BS is moved deeply to the BS D and the strength of pilot of BSD becomes stronger than T_ADD and the strength of pilot of BS A is below T_DROP for T_TDDROP(timer) continuously. BSC drops base station A and then add base station D.

FIG. 4 illustrates handoff movement standard in the aspect of mobile station. As illustrated, in case terminal moves from base station A to B, the strength of base station A becomes lower as time goes by and the strength of base station B becomes higher.

The strength of base station B increases gradually, and at that state T-ADD handoff is started, this process is called ADD. In this state terminal center is being served from base station A and B simultaneously.

After mobile station moves to the region of base station B and the strength of base station decreases to T_DROP, TSC requests to drop base station A when the strength is below T_DROP during T_DROP continuously, this is called DROP.

From the point that the strength of base station B is above T_ADD to the point that base station A is below T_DROP for T_DROP continuously is the handoff sector., For one TSC, base station transfer system(BTS: cell) can execute softer add(channel setup through soft handoff between sector 1), BSC can service 3 BTS.

When softer handoff happens between 2 sectors in one cell(BTS), BTS combines 2 paths from mobile station, and receives/transmits with station through 2 assigned courses.

BSC assigns port on each 3 BTS and chooses the least CRC error traffic packet every 20 ms. Because each BTS includes 2 sectors, in case softer and soft handoff happen at the same time, 6 active set can be allocated.

TSC chooses the least error signal maximum 6 active set. TSC recombines only 3 signals as the signals arrive in order among many signals which is sent from active set BSC cannot change active set unless pilot in the previous active set satisfies the drop condition (is lower than T_DROP), or system(base station) commands to drop.

Terminal sends pilot signal measurement message again after the pilot strength exceeds T_COMP, if the requested handoff is fail to add in the state that pilot strength is T_ADD.

In the previous technology handoff couldn't be executed in the more than 3 base station regions simultaneously, so if the power of previous 3 active sets are above T_ADD, the power of Candidate set becomes T_ADD+COMP in the region with more than 3 inter-cells, it cannot accept the handoff request of mobile station even if pilot signal measurement message is sent again.

Therefore, TSC cannot execute handoff in case it is already receiving signals from 3 base stations even though the pilot strength in candidate set is higher than one of the previously-activated set as much as T_COMP. So the signal of candidate set functions to other participants as an interference.

In other words, in the situation that BSC cannot execute handoff in the new candidate set, it causes the result that interference increases on the target cell as much as handoff is delayed.

The number of active set, handoffs per call in one TSC should be minimized, however, handoff might be tried over necessary in the region with more than 3 inter-cells.

Because pilot power can be distributed irregularly in the midtown where the cell radius is low, handoff can happen in the center of the target cell. In this case, cutting call or degeneration of communication quality can happen Accordingly, it is an object of the present invention to provide a soft swap handoff method to execute T_DROP and T_ADD, i.e., a method to drop forcibly base station which has the lowest pilot strength, and adds the base station which has new pilot.

To achieve the above object, in the region where the density of radio wave of CDMA system is high in case that the pilot signal is detected from more than three BSs by superposition, there is provided a soft swap handoff method in CDMA cellular system to perform optimal handoff by adding the BS with the strongest pilot strength comprising the steps of:

sending the pilot strengths of the present-added BSs and the newly detected BSs whereof the pilot strength is above T_ADD the threshold value of said pilot strength to BSC through PSMM;

sending HDM to said mobile station to drop the BS with said weakest pilot strength by activating only the remaining BSs except the BS with said weakest pilot strength after comparing the pilot strength of the present-added BSs through said PSMM transferred from said moving station to said BSC;

dropping applicable BS by said BSC after said moving station receives said HDM from said BSC and drops the BS with the weakest pilot strength among the present-added BSs and sends the result to said BSC through HCM;

sending PMRO from BSC to said mobile station to inform pilot strength of adjacent BSs detected by said mobile station;

sending said pilot strength of said candidates to BSC through PSMM in order to set the BSs whereof pilot strength is above T_ADD at present and the BS which was added once but now is dropped, as candidate set of newly added BS;

sending the HDM to said mobile station in order to perform handoff after comparing the pilot strengths by said BSC and adding the BS with the strongest pilot strength among the candidates to be added newly; and sending the results to said BSC through HCM after that said mobile station receives said HDM and adds the BS with the strongest pilot strength among the candidates to be added newly and handoff is performed.

In the present invention, it is preferable that said BS consists of BTS and BSC, it is preferable that said BTS can execute softer ADD of two sectors for one mobile station, and said BSC can connect 3 BTS, it is preferable that if 2 softer handoffs happen in said one BTS, said BTS combines 2 routes from said mobile station and sends it to said BSC and communicates with said mobile station through 2 routes, it is preferable that said BSC assigns ports to each of three BTSs and selects the traffic packet with the least CRC error every 20 msec, it is preferable that if in a mobile station softer and soft handoff is performed simultaneously, six Pilot offsets can be assigned, it is preferable that the number of said candidates to be added is restricted to seven, it is preferable that the number of said BS to be added is restricted to three.

SUMMARY OF THE INVENTION

In carrying our invention in one preferred mode, in the region where the density of radio wave of CDMA system is high, in case that the pilot signal is detected from more than three BSs by superposition, there is provided a soft swap handoff method in CDMA cellular system to perform optimal handoff by adding the BS with the strongest pilot strength comprising the steps of: sending the pilot strengths of the present-added BRSs and the newly detected BSs whereof the pilot strength is above T_ADD the threshold value of said pilot strength to BSC through PSMM; sending HDM to said mobile station to drop the BS with said weakest pilot strength by activating only the remaining BSs except the BS with said weakest pilot strength after comparing the pilot strength of the present-added BSs through said PSMM transferred from said moving station to said BSC; dropping applicable BS by said BSC after said moving station receives said HDM from said BSC and drops the BS with the weakest pilot strength among the present-added BSs and sends the result to said BSC through HCM; sending PMRO from BSC to said mobile station to inform pilot strength of adjacent BSs detected by said mobile station; sending said pilot strength of said candidates to BSC through PSMM in order to set the BSs whereof pilot strength is above T_ADD at present and the BS which was added once but now is dropped, as candidate set of newly added BS; sending the HDM to said mobile station in order to perform handoff after comparing the pilot strengths by said BSC and adding the BS with the strongest pilot strengths among the candidates to be added newly; and sending the results to said BSC through HCM after that said mobile station receives said HDM and adds the BS with the strongest pilot strength among the candidates to be added newly and handoff is performed.

BRIEF DESCRIPTION OF THE DRAWINGS

The invention's another purpose and merit will be more clear by reading following explanation in detail and referring following drawings.

Figure 1:
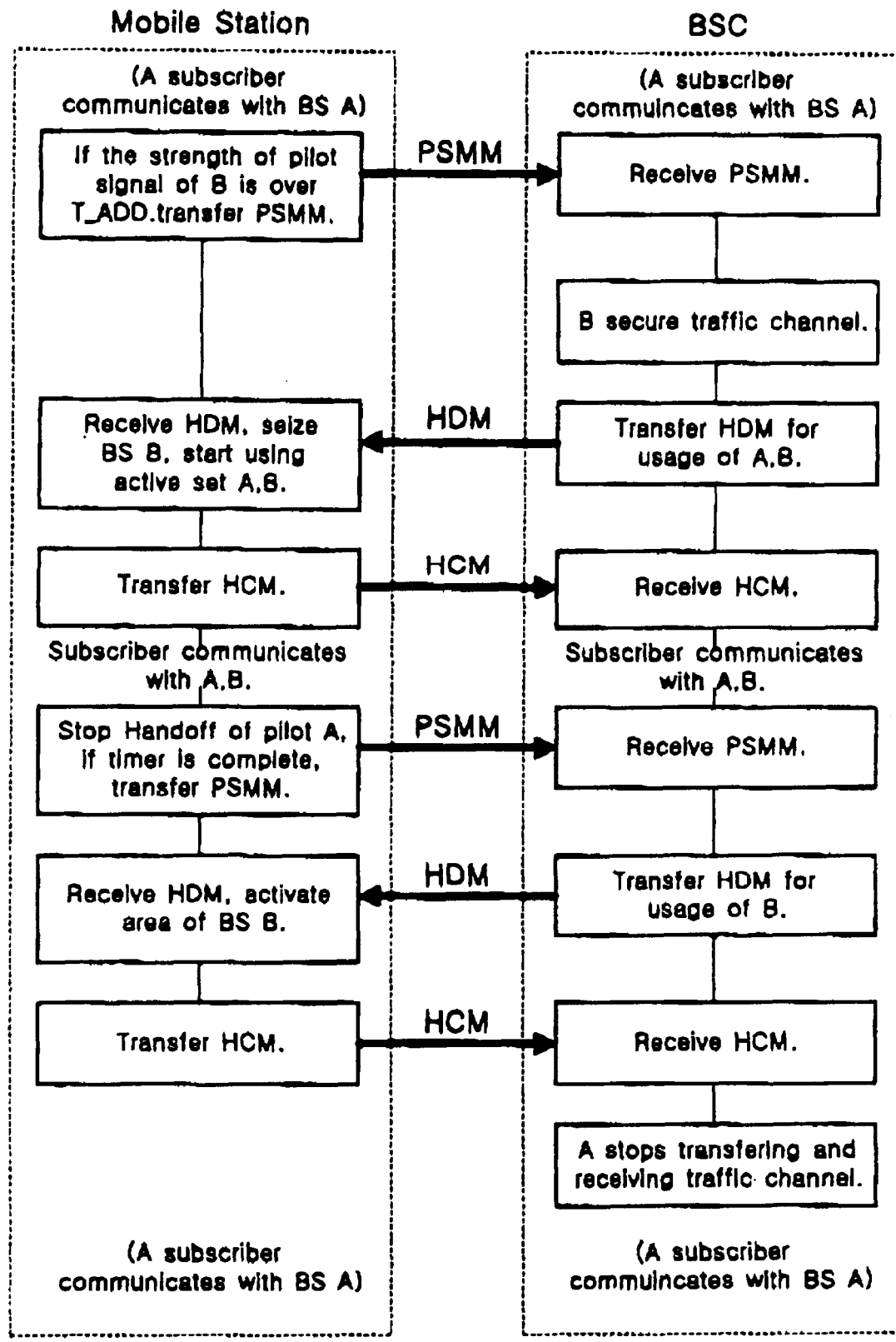
FIG. 1 illustrates a flow chart of soft handoff movement executed between mobile station and base station.
Figure 2:
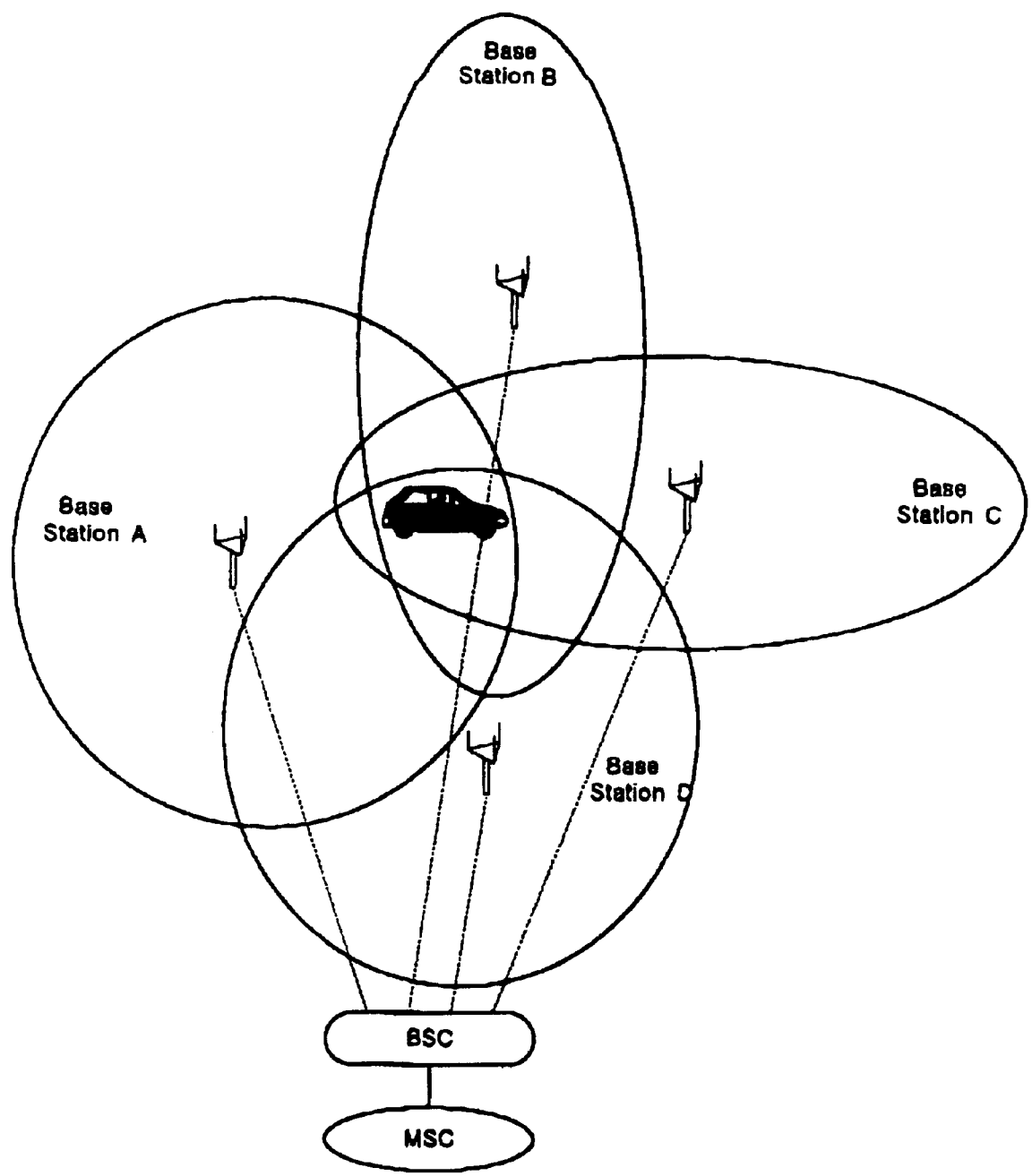
FIG. 2 illustrates an over 3 inter-cell mobile station
Figure 3:
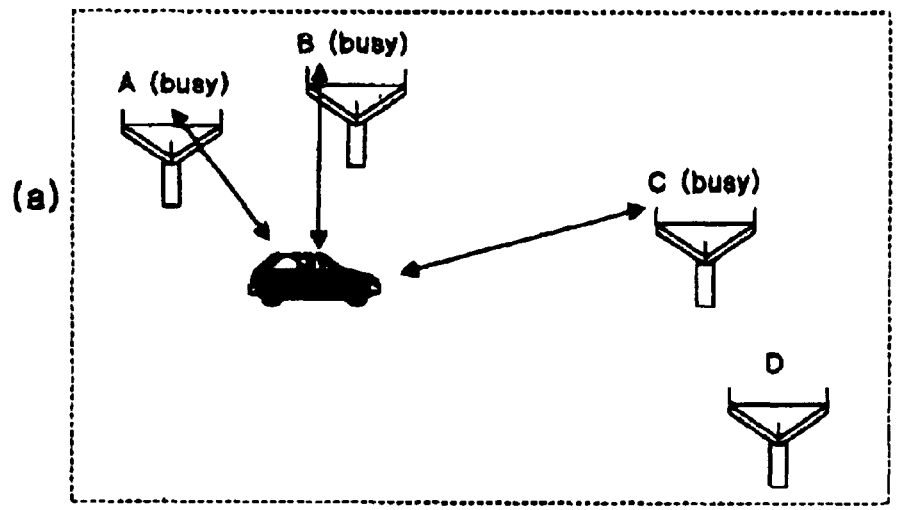
FIG. 3 illustrates a flow chart of handoff method by previous system for over 3 inter-cell mobile station.
Figure 3:
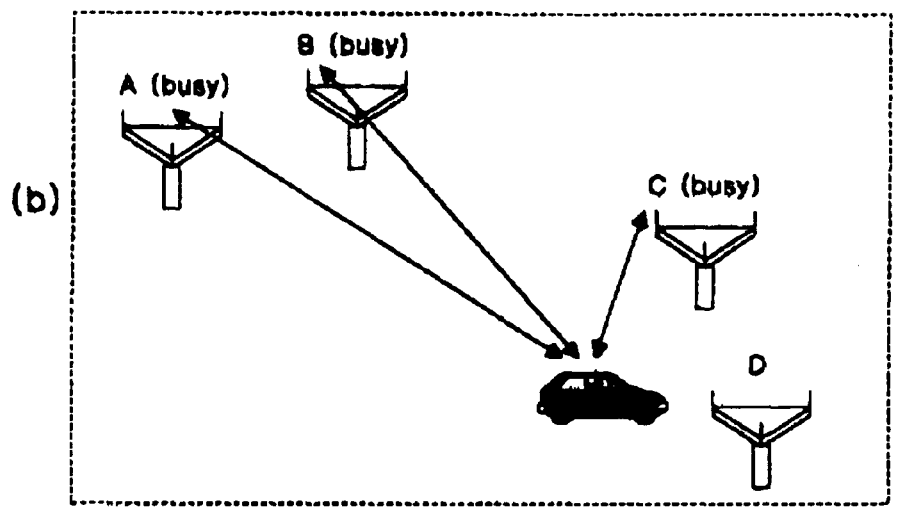
Figure 3:
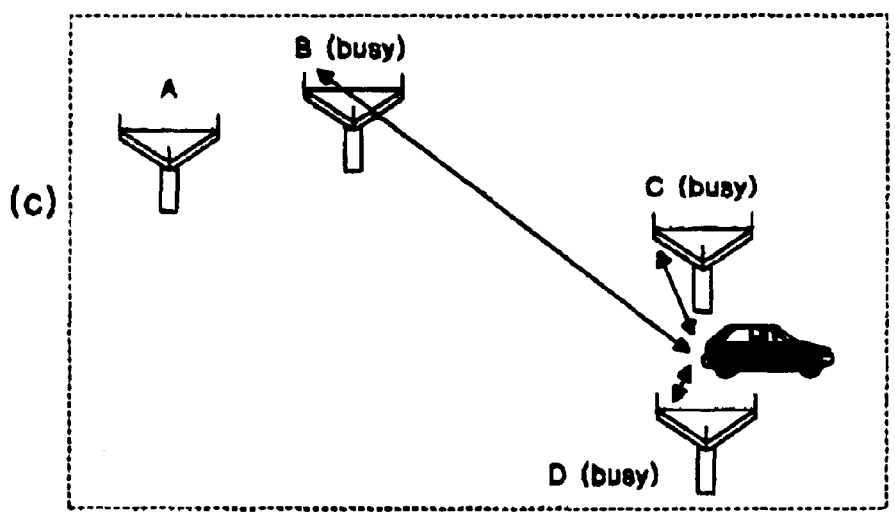
Figure 4:
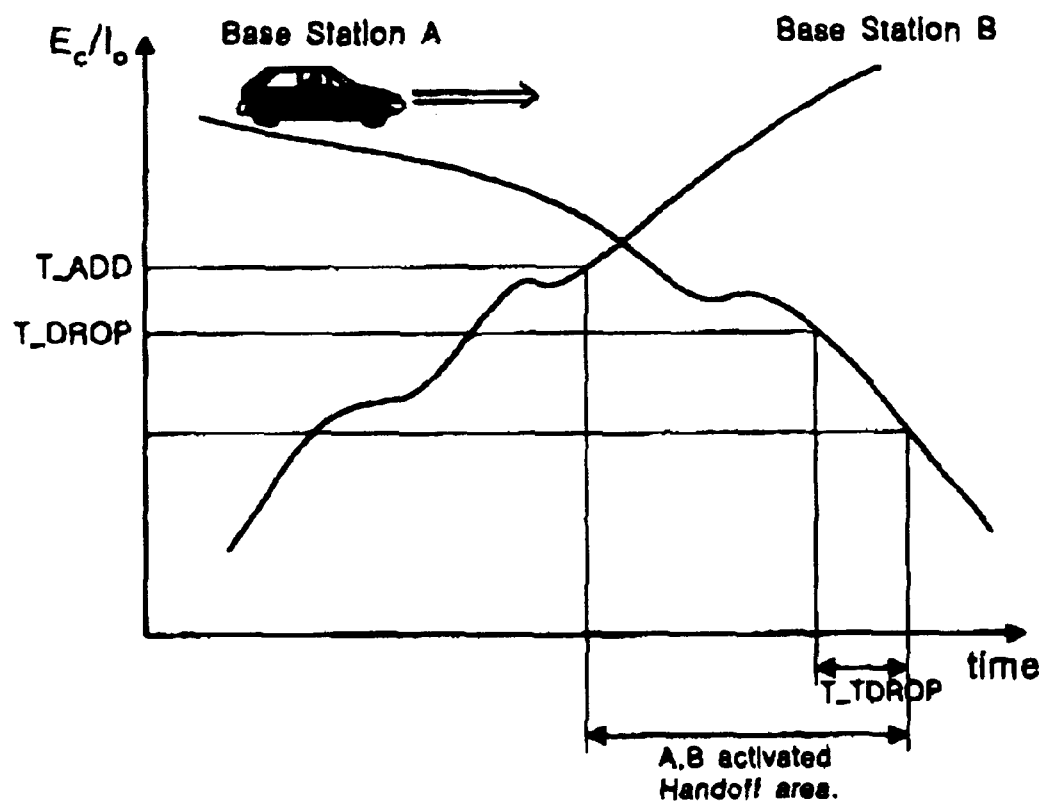
FIG. 4 illustrates a standard handoff process in respect to mobile station

While the invention is susceptible to various modification and alternative forms, specific embodiments thereof have been shown by way of example in the drawings and will be herein be described in detail. It should be understood, however, that it is not intended to limit the invention to the particular forms disclosed, but on the contrary, the intention is to cover all modification, equivalents, and alternatives falling within the spirit and scope of the invention as defined by the appended claims.

DESCRIPTION OF THE PREFERRED EMBODIMENTS

Soft swap handoff method of the invention is a method that keeps the best handoff condition by selecting the highest inter-cell base station and adding.

In case power of another adjacent cell exceeds T_ADD in the state 3 cells is added, mobile station requires handoff from neighboring cell by sending PSMM to BSC.

BSC assigns added pilot signals in order of the strength and then compares the power of pilot with the lowest frequency assignment and pilot that newly requested adding, and executes soft swap handoff if the later exceeds former higher than T_COMP.

That is, it drops the cell which has the lowest frequency pilot and adds cell which has the pilot that newly requested adding.

Figure 5:
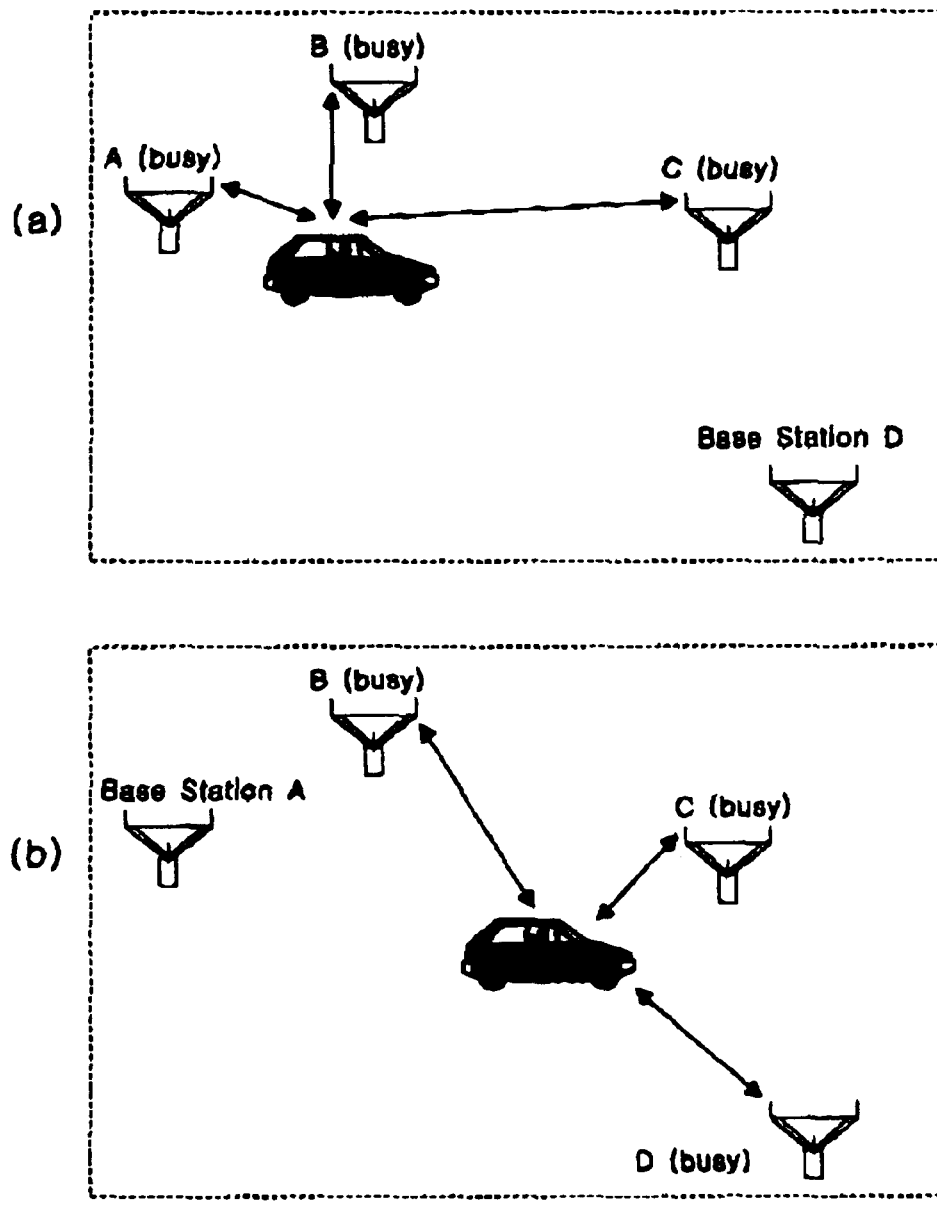
FIG. 5 illustrates an over inter-cell mobile station handoff method of the invention.

In FIG. 5 handoff for over 3 inter-cell mobile station is illustrated.

BSC executes handoff through illustrated soft swap handoff process because it has limitation that mobile station and up to 3 cells can execute soft handoff simultaneously.

FIG. 5 (A) illustrates that mobile station is in the state of adding with cell A, B, C, and strength of cell D is still below T_ADD.

FIG. 5 (B) illustrates that cell moves to cell D sector, strength of cell D; strength of pilot signal is higher than cell A but the strength of cell A is still above T_DROP.

In this case, mobile station drops the cell A because of the lowest frequency assignment among cell A,B,C,D through soft swap handoff, and keeps soft add state with cell B,C,D that are still higher respectively.

Figure 6:
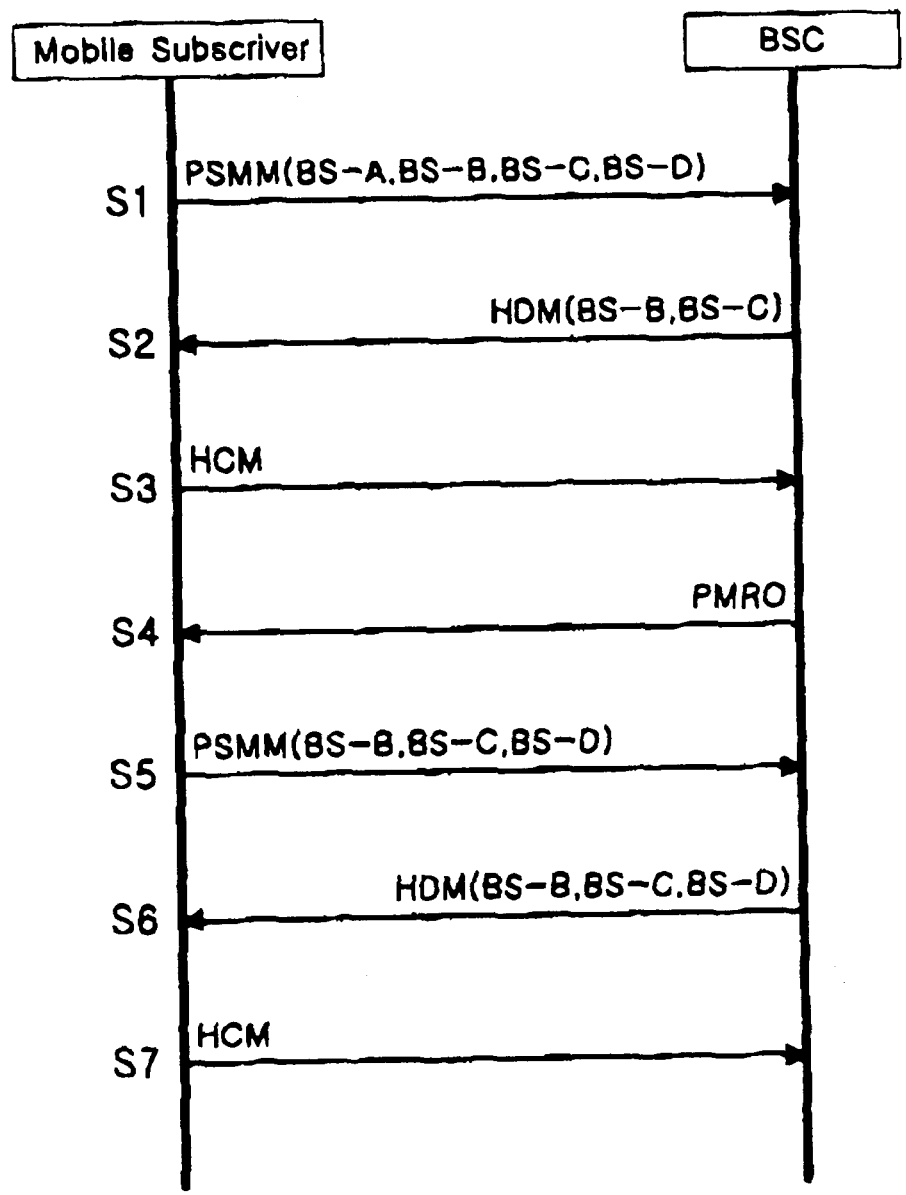
FIG. 6 illustrates a flow chart of soft swap handoff process.

FIG. 6 illustrates a soft swap handoff process of the invention. As illustrated, soft swap handoff method comprises step 1, which informs pilot strength of new cell detected as above T_ADD to BSC; step 2, 3, which drops cell with the lowest frequency assignment by activating cells except the lowest cell; step 4, which requests to inform pilot strength of neighboring cell detected by mobile station in the present; step 5, which perceives cells above T_ADD in the BSC; step 6, 7, which adds cells which are above T_ADD.

FIG. 6 S1 illustrates the state that mobile station transfers pilot strength of now-added cell A,B,C or D which are newly measured as above T_ADD to BSC through PSMM signal. FIG. 6 S2 is the state that BSC compares pilot power which is received from mobile station and transfers HDM to mobile station to commands handoff on the rest 2 cells except the cells with the lowest frequency assignment(cell B,C) among now-added cells.

FIG. 6 S3 illustrates the state it mobile station transfers HCM to BSC after receiving HDM signal. Here, BSC drops the lowest applicable cell that HCM signal hasn't transferred.

FIG. 6 S4 illustrates the state that BSC sends pilot measurement request order (PMRO) to let pilot strength of all neighboring cells detected by mobile station in the present be informed.

FIG. 6 S5 illustrates the state that transfers pilot power of cell B,C,D which is detected above T_ADD in the present in mobile station that received PMRO through PSMM;

FIG. 6 S6 illustrates the state that compares pilot strength which is received from BSC and sends HDM to mobile station to add above T_ADD cell D.

FIG. 6 S7 illustrates the state that mobile station adds cell D after receiving HDM and sends the result to BSC through HCM.

Through said S6 and S7 cell B,C,D are added. By executing above-mentioned S1, S2, S3, S4, S5, S6, S7, soft swap handoff can be executed.

As explained previously, soft swap handoff means execution T_DROP and T_ADD continuously.

That is, when above T_ADD pilot strength is newly detected, cell which has the lowest frequency assignment pilot is dropped forcibly among already added cells and the cell which has new pilot is added.

Soft swap handoff method is a method that keeps the best handoff condition by choosing and adding cell with the best power in the inter-frequency area.

By applying soft swap handoff, the inter-prevention on neighboring cell can be reduced because of quick soft handoff with better power from inters frequency area.

Besides, reducing the number of soft handoff can lessen the system load and the possibility of handoff in the middle of the target cell it can get an effect of handoff efficiency and raise communication quality.

I claim:

1. In the region where the density of radio wave of CDMA system is high, in case that the pilot signal is detected from more than three BSs by superposition, a soft swap handoff method in CDMA cellular system to perform optimal handoff by adding the BS with the strongest pilot strength, comprising the steps of:

sending the pilot strengths of the present-added BSs and the newly detected BSs whereof the pilot strength is above T_ADD the threshold value of said pilot strength to BSC through PSMM;

sending HDM to a mobile station to drop the BS with said weakest pilot strength by activating only the remaining BSs except the BS with said weakest pilot strength after comparing the pilot strength of the present-added BSs through said PSMM transferred from said mobile station to said BSC;

dropping applicable BS by said BSC after said mobile station receives said HDM from said BSC and drops the BS with the weakest pilot strength among the present-added BSs and sends the result to said BSC through HCM;

sending PMRO from BSC to said mobile station to inform pilot strength of adjacent BSs detected by said mobile station;

sending said pilot strength of said adjacent BSs to BSC through PSMM in order to set the BSs whereof pilot strength is above T_ADD at present and the BS which was added once but now is dropped, as candidate set of newly added BS;

sending the HDM to said mobile station in order to perform handoff after comparing the pilot strengths by said BSC and adding the BS with the strongest pilot strength among the candidates to be added newly; and sending the results to said BSC through HCM after that said mobile station receives said HDM and adds the BS with the strongest pilot strength among the candidates to be added newly and handoff is performed.

2. A soft swap handoff method of CDMA cellular system as set forth in claim 1, wherein said BS consists of BTS and BSC.

3. A soft swap handoff method of CDMA cellular system as set forth in claim 2, wherein said BTS can execute softer ADD of two sectors for one mobile station, and said BSC can connect 3 BTS.

4. A soft swap handoff method of CDMA cellular system as set forth in claim 3, wherein if 2 softer handoffs happen in said one BTS, said BTS combines 2 routes from said mobile station and sends it to said BSC and communicates with said mobile station through 2 routes.

5. A soft swap handoff method of CDMA cellular system as set forth in claim 4, wherein said BSC assigns ports to each of three BTSs and selects the traffic packet with the least CRC error every 20 msec.

6. A soft swap handoff method of CDMA cellular system as set forth in claim 5, if in a mobile station softer and soft handoff is performed simultaneously, six Pilot offsets can be assigned.

7. A soft swap handoff method of CDMA cellular system as set forth in claim 1, wherein the number of said candidates to be added is restricted to seven.

8. A soft swap handoff method of CDMA cellular system as set forth in claim 1 or claim 7, wherein the number of said DS to be added is restricted to three.

* * * * *